(12) United States Patent
Jolly et al.

(10) Patent No.: US 12,480,236 B2
(45) Date of Patent: Nov. 25, 2025

(54) APPARATUS FOR BONDING A FIBER STRUCTURE

(71) Applicant: NORAFIN TECHNOLOGIES GMBH, Mildenau (DE)

(72) Inventors: Marc Jolly, Mildenau (DE); André Lang, Sehmatal-Cranzahl (DE); Anton Peter, Sechmatal-Cranzahl (DE)

(73) Assignee: Norafin Technologies GmbH, Mildenau (DE)

( * ) Notice: Subject to any disclaimer, the term of this patent is extended or adjusted under 35 U.S.C. 154(b) by 206 days.

(21) Appl. No.: 18/036,303

(22) PCT Filed: Nov. 8, 2021

(86) PCT No.: PCT/EP2021/080933
§ 371 (c)(1),
(2) Date: May 10, 2023

(87) PCT Pub. No.: WO2022/101134
PCT Pub. Date: May 19, 2022

(65) Prior Publication Data
US 2023/0407538 A1 Dec. 21, 2023

(30) Foreign Application Priority Data
Nov. 10, 2020 (DE) .......................... 102020129628.2

(51) Int. Cl.
*D04H 1/492* (2012.01)
*D04H 1/495* (2012.01)
*D04H 18/04* (2012.01)

(52) U.S. Cl.
CPC ............. *D04H 1/492* (2013.01); *D04H 1/495* (2013.01); *D04H 18/04* (2013.01)

(58) Field of Classification Search
CPC ........ D04H 18/04; D04H 1/465; D04H 1/492; D04H 1/495; D04H 3/11; D04H 5/03;
(Continued)

(56) References Cited

U.S. PATENT DOCUMENTS 3,508,308 A * 4/1970 Wallar, Jr. ............... D04H 1/492
28/104
4,995,151 A * 2/1991 Siegel .................... D06C 23/00
26/69 R
(Continued)

FOREIGN PATENT DOCUMENTS

DE 102019202385 A1 8/2020
EP 2302121 A1 3/2011
WO WO-2006070513 A1 * 7/2006 ............. A47L 13/16

*Primary Examiner* — Amy Vanatta
(74) *Attorney, Agent, or Firm* — Wood, Phillips, Katz, Clark & Mortimer

(57) ABSTRACT

The invention relates to an apparatus (1) for bonding a fiber structure (2) by means of a fluid (3), comprising a fluid jet head (9) having a nozzle (20) for discharging the fluid (3), a manipulator (4), and a fiber receptacle (25) for arranging the fiber structure (2), wherein the fluid jet head (9) is arranged as an effector (8) on the manipulator (4), and wherein the manipulator (4) is provided in such a way that the fluid jet head (9) arranged thereon can be moved in at least two spatial directions (10.1, 10.2, 10.3) relative to the fiber receptacle (25).

17 Claims, 5 Drawing Sheets

(58) Field of Classification Search
CPC .......... D04H 18/00; D04H 1/498; D06B 1/02;
D06B 11/0059; B26F 3/004; B33Y 80/00
USPC .......................... 28/104, 105; 68/201, 205 R
See application file for complete search history.

(56) References Cited

U.S. PATENT DOCUMENTS

| | | | | |
|---|---|---|---|---|
| 5,226,217 | A * | 7/1993 | Olry | D04H 18/02 |
| | | | | 28/107 |
| 5,914,002 | A * | 6/1999 | Cahuzac | D04H 3/002 |
| | | | | 156/92 |
| 6,105,222 | A * | 8/2000 | Fleissner | D04H 18/04 |
| | | | | 28/104 |
| 2001/0018786 | A1* | 9/2001 | Greenway | D04H 18/04 |
| | | | | 28/104 |
| 2006/0113714 | A1* | 6/2006 | Giloh | B29C 41/36 |
| | | | | 425/96 |
| 2008/0311816 | A1* | 12/2008 | Mooshammer | D04H 18/04 |
| | | | | 28/271 |
| 2014/0235140 | A1 | 8/2014 | Maurer | |
| 2015/0299920 | A1 | 10/2015 | Yanamoto et al. | |
| 2016/0168774 | A1* | 6/2016 | Breithaupt | B29D 35/00 |
| | | | | 442/381 |
| 2017/0306539 | A1 | 10/2017 | Gladish et al. | |

\* cited by examiner

APPARATUS FOR BONDING A FIBER STRUCTURE

FIELD OF THE INVENTION

The present invention relates to an apparatus for bonding a fiber structure by means of a fluid.

BACKGROUND OF THE INVENTION

Prior art plants for water jet bonding are known in which a fiber web passes through as line material under a water jet bar. This has a large number of nozzles arranged next to each other perpendicular to the machine direction in which the line material is moved. The water jets act on the line material from above, and a collecting basin for the process water is provided underneath. The fibers, which are still more or less loosely connected in the fiber web, are swirled by the water jets and intertwined with each other, e. g. bonded to form a nonwoven fabric.

BRIEF SUMMARY OF THE INVENTION

The present invention is based on the technical problem of providing an advantageous apparatus for bonding a fiber structure.

This is solved with the apparatus according to claim 1. This has a fiber receptacle for arranging the fiber structure and a fluid jet head with a nozzle for emitting the fluid. The fluid jet head is arranged on a manipulator and can be moved with the manipulator in at least two spatial directions relative to the fiber receptacle.

In contrast to the prior art mentioned at the beginning, the entire fiber structure is not or does not necessarily have to be bonded, but can also be bonded only in defined areas by positioning the fluid jet head accordingly. In the case of a line or sheet material, such a locally limited bonding can, for example, achieve an increased degree of bonding in certain areas (the fibers are more strongly intertwined locally). This can, for example, open up optical design possibilities, such as the inscription of a line, etc. (patterns, lettering, etc.). The fiber structure can also be multilayered, whereby the locally limited bonding makes it possible, for example, to connect the layers in a similar way to stitching, and with a high degree of flexibility.

The subject matter is not limited to a two-dimensional sheet or line material. The fluid jet head can also be moved with the manipulator relative to a three-dimensionally shaped fiber structure, which, for example, in addition to the extension in the two area directions, also has an extension in a thickness direction, in particular a varying extension, i. e. a contour. Such a fiber structure can, for example, be designed as an insert for a housing, e. g. for insulation or soundproofing, applications in car body construction etc. are also possible, see below in detail. A three-dimensional fiber structure can be created, for example, by placing fiber components and/or fiber layers on top of each other, and the manipulator can then be used to guide the fluid jet head, for example, specifically into connection areas. The fiber structure can also be bonded as a whole, for example with different exposure times in different areas and/or varying fluid pressure.

In summary, the combination of manipulator and fluid jet head opens up various applications, e. g. it offers a high degree of flexibility. Compared to the water jet bar mentioned at the beginning, selective bonding, in which only the areas required for the finished product are actually bonded and, for example, edge areas remain unbonded, e. g. are left as fiber web, can also be advantageous in terms of material economy. The non-bonded or only slightly bonded edge areas can then be used again with less effort, i. e. they can be brought back into production.

Further preferred embodiments can be found in the dependent claims and the entire disclosure, whereby in the description of the features, a distinction is not always made in detail between aspects of the apparatus and aspects of the method or use relating to its application; in any case, the disclosure is to be read implicitly with regard to all categories of claims. If, for example, an apparatus suitable for a particular application is described, this is at the same time to be read as a disclosure of a corresponding method or use, and vice versa.

The nozzle of the fluid jet head can, for example, have an opening width of at least 50 μm, further and especially preferably at least 70 μm or 80 μm. Possible upper limits can be, for example, at most 1 mm, further and especially preferably at most 0.3 mm or 0.2 mm. Preferably, the opening may be circular, i. e. the width specifications are to be read in terms of opening diameters. In detail, the width may also depend on the type of fluid; although water jet bonding is preferred, the subject matter of the invention is generally not limited to it, alternatively, for example, air or generally a gaseous fluid may also be provided. The fluid jet head may have exactly one or also more nozzles, see in detail below.

The fiber structure can be made of continuous and/or staple fibers. In its initial state, the fibers may still be arranged together in a substantially unbonded state, e. g. it may be an unbonded fiber web. At least after the bonding of the fiber structure with the presently disclosed bonding apparatus, i. e. in the bonded fiber structure, the fibers hang together due to the fiber-fiber entanglement. However, a certain degree of entanglement may already be present in the initial state, whereby the degree of entanglement is lower than in the readily bonded fiber structure. In general, the fibers can also be held together with a binder, but preferably they are held together without a binder in the readily bonded fiber structure, preferably solely due to the fiber entanglement. The latter can be advantageous, for example, for ecological and also economic reasons and can be made possible by the targeted bonding with manipulator and fluid jet head.

The fiber receptacle can be, for example, a support on which the fiber structure is placed. In a simple case, it can be a flat surface, but contours are also possible, see below in detail. In general, the fiber receptacle can also be a cage in which the fiber structure is held and is accessible from different sides, e. g. from above and also from below. The manipulator has one or more axles which are provided on a base, preferably a stationary foundation. The axles can, for example, be equipped with drive units (motors, etc.) and mechanically coupled via connecting elements. With two axes, for example, it is already possible to realize the relative movement in at least two spatial directions as claimed in claim 1.

In a preferred embodiment, the manipulator is designed such that the fluid jet head arranged thereon can be moved in three spatial directions. In general, the "spatial directions" refer to a stationary coordinate system. According to claim 1, a relative positioning in x- and y-direction is possible, preferably a relative positioning in z-direction is also possible (x-, y- and z-direction are perpendicular to each other). In the case of a three-dimensional fiber structure mentioned above, the x- and y-directions can, for example, coincide with its area directions and the z-direction with the thickness direction.

Regardless of the number of spatial directions, the relative mobility can be realized mechanically in different ways, so there are several possibilities for the relative arrangement and mounting of the axes of the manipulator. For example, the manipulator can be constructed as a gantry robot, i. e. with linear guides (on two or three mutually perpendicular axes). Preferably, the manipulator is designed as a jointed-arm robot, e. g. as a 5-, 6- or 7-axis jointed-arm robot, as a dual-arm robot, palletizing robot or SCARA robot. A jointed-arm robot can, for example, allow particularly flexible guidance of the fluid jet head, which can thus be adapted to different fiber structure geometries.

In general, the manipulator is preferably controlled by a programmable control unit, which can be integrated or connected as an external computer via an interface. When certain method sequences are described here, this should also be read as a disclosure to the effect that the control unit is configured to cause the manipulator to perform corresponding steps.

In a preferred embodiment, the manipulator is provided in such a way that the fluid jet head can not only be displaced relative to the fiber receptacle, but also tilted. Tilting allows the angle of incidence to be changed, which includes the main emission direction of the nozzle with the fiber receptacle. This means that the angle of incidence at which the fluid hits the surface of the fiber structure can be adjusted during operation, e. g. a different angle of incidence can be selected in different areas. In case of a fiber structure with a contoured surface, however, the angle of incidence can also be kept constant across the fiber structure by tilting.

According to a preferred embodiment, a surface of the fiber receptacle, against which the fiber structure rests during operation, is bulged at least in certain areas. This bulge can be concave or convex as seen from the fiber structure, i. e. as seen from the cavity provided for receiving the fiber structure; a combination of a concave design in some areas and a convex design in some areas is also possible. The curvature can be used to give the fiber structure a corresponding shape. The fiber structure itself can be introduced into the fiber receptacle as a flat material or it can be pre-contoured.

In a preferred embodiment, a surface of the fiber receptacle against which the fiber structure rests is provided with a plurality of openings. The surface can, for example, be formed by a grid, whereby the rods or wires of the grid, for example, delimit the openings with one another. Likewise, the openings can be provided, for example, as holes in a surface, e. g. as perforations in a sheet material (e. g. a metal sheet) or as mouth openings of through channels in a sheet or volume material. During operation, the fluid emitted via the fluid jet head can be drained through the openings, i. e. after acting on the fiber structure. Figuratively speaking, this can prevent a "backwater" of the fluid and thus an undefined deflection or deceleration of the fluid jet. The holes can, for example, be arranged in a grid-like distribution in the surface, regardless of whether this is curved or flat (in certain areas).

The surface of the fiber receptacle does not have to be a continuous surface as a whole; it can also be formed by several separate partial surface areas. For example, several fiber-receiving elements can be arranged next to each other, each of which forms a partial surface area. The fiber-receiving elements can, for example, be rods which are arranged next to each other in a bundle, with the end face of the respective rod forming the respective partial surface area of the surface. In general, the fiber-receiving elements arranged next to each other can also be provided in such a way that they can be offset relative to each other, so that different contours can be set as required, i. e. different surface characteristics. In the case of the rods, these can be mounted so that they can be displaced along their longitudinal axis, for example, so that the partial surface areas at the ends can be brought into different relative positions by displacing the rods relative to each other and thus different surface contours can be set.

In a preferred embodiment, at least one surface part of the fiber receptacle, against whose surface the fiber structure rests, is an additively manufactured part. The fiber receptacle can be a coherent additively manufactured part as a whole, but it can also be constructed in several parts. In this case, it can be composed of several additively manufactured surface parts and/or also comprise one or more conventionally produced surface parts. The latter can, for example, define a basic shape that is supplemented with one or more additively manufactured and thus individually customized surface parts depending on the desired product.

Where reference is made in this context to a "surface part" of the fiber receptacle, this refers to a part with a surface for contact with the fiber structure, i. e. against which the fibers are applied during operation. In addition, the fiber holder can of course include assembly and fastening elements that hold the surface parts together, for example in the case of a multi-part structure.

An "additively manufactured part" is a part built up from a previously shapeless or shape-neutral material on the basis of a computer model (e. g. CAD model), whereby this build-up takes place e. g. in layers and an area corresponding to the shape specification from the computer model is applied or solidified per layer. The additively manufactured part can in particular be a 3D printed part, which was thus built up in layers with a print head emitting the material. The material can be, for example, plastic, but a metallic surface part is also possible (production, for example, by laser sintering or in a powder bed method). Also disclosed is a method of manufacturing an apparatus for bonding a fiber structure, as discussed above, wherein at least one surface part of the fiber receptacle is manufactured additively, in particular in one of the methods just mentioned.

In a preferred embodiment, the apparatus comprises a further manipulator on which the fiber receptacle is arranged as an effector. With the further manipulator, the fiber receptacle can be moved in a stationary coordinate system, for example in at least two or preferably three spatial directions. With regard to possible embodiments of the further manipulator, reference is made to the above disclosure; this can be constructed, for example, as a gantry robot or as a jointed-arm robot, etc. As both the fluid jet head and the fiber receptacle are arranged on a manipulator each, they can be brought into different relative positions in a particularly flexible manner. Apart from suspension points, etc., the fiber receptacle can in principle be accessible from all directions. As mentioned above, the fiber receptacle can, for example, be constructed as a cage, which prevents the fiber structure from falling out, regardless of the orientation in the stationary coordinate system. The cage can, for example, be hinged open so that the fiber structure can be easily inserted and removed again after solidification. A method is also disclosed in which the fiber structure is bonded sequentially from different sides with the fluid jet emitted by the fluid jet head, in particular from opposite directions (viewed in the coordinate system of the fiber structure).

According to a preferred embodiment, the apparatus has a fiber emission unit with which fibers can be applied to the fiber receptacle and/or the fiber structure already arranged there during operation. In the simplest case, the fibers can simply fall out, preferably they are accelerated with a fluid jet, in particular a gaseous fluid, preferably air, in the direction of the fiber receptacle or the fiber structure. The fluid jet takes the fibers with it and they attach themselves to the fiber receptacle or the fiber structure. Preferably, the fiber receptacle and the fiber emission unit are movable relative to each other, and particularly preferably, the fiber emission unit can be mounted so that it can be moved when viewed in a stationary coordinate system, e. g. arranged on a gantry robot.

Regardless of the technical implementation in detail, the fiber emission unit can preferably be moved over the fiber receptacle, whereby in a preferred application fibers are output in certain areas and no fibers are output in certain areas or at least a smaller number of fibers are output. In this way, for example, a fiber structure with different properties in different areas can be built up (see above), for example, different fibers can be applied sequentially and/or more fibers can be output in different areas. The fiber structure can be built up successively in several layers, for example, whereby fibers can only be applied in certain areas in each layer, so that a three-dimensional fiber structure can be built up comparable to a height profile.

According to a preferred embodiment, the fluid jet head has a total of at most 500 nozzles for emitting the fluid, in the order mentioned increasingly preferably at most 400, 300, 200, 100, 80, 60, 50, 40, 30, 20 or 10 nozzles. The fluid jet head may also have exactly one nozzle, but there may also be possible lower limits of at least 2, 3, 4 and 5 nozzles respectively, whereby the lower and upper limits may also be of interest independently of each other and shall be disclosed respectively. The provision of more than one nozzle can be advantageous, for example, with regard to the possible energy input and thus the method duration, whereby an upper limit can be advantageous, for example, with regard to the accuracy.

The fluid jet head can also be valve-controlled, for example, in such a way that the number of nozzles used to dispense the fluid can be changed during operation. In one operating mode, for example, the fluid can be emitted at all nozzles of the fluid jet head in order to act on a large area of the fiber structure, whereas in another operating mode, for example, the fluid can only be emitted at some or even only one of the nozzles in order to act on a smaller area and thus to structure it more finely.

Independent of such control functions, the area of the fluid jet head occupied by the nozzle(s) can also be limited in a preferred embodiment, i. e. in other words, a distribution of the nozzles that does not cover too large an area can be preferred. This can, for example, offer advantages in terms of accuracy and thus also flexibility (accessibility of fine structures). The area occupied by the nozzle(s), i. e. all the nozzles of the fluid jet head, may for example amount to a maximum of 5 $cm^2$, 4 $cm^2$, 3 $cm^2$, 2 $cm^2$ or 1 $cm^2$ (increasingly preferred in the order mentioned). A lower limit may result in the case of a fluid jet head with a single nozzle as its diameter (see above), in the case of several nozzles further lower limits may be, for example, 0.1 $cm^2$, 0.25 $cm^2$ or 0.5 $cm^2$. In the case of several nozzles, the area is determined by means of an envelope around the nozzles, i. e. as the area enclosed by the envelope.

If the fluid jet head has several nozzles, an alignment such that their main emission directions are essentially parallel to each other may be preferred. "Essentially parallel" means, for example, tilted by no more than 10° to each other, in the order in which they are mentioned increasingly preferably no more than 8°, 6° or 4°. As far as technically possible, an exactly parallel alignment (0°) may also be preferred.

The invention also relates to a method for bonding a fiber structure, in which a fluid jet head with nozzle and a fiber structure are moved relative to one another by means of a manipulator in at least two, preferably three, spatial directions. The fiber structure can be arranged in a fiber receptacle described above, whereby, for example, the fiber receptacle is at rest when viewed in a stationary coordinate system and the fluid jet head is moved with the manipulator. Alternatively, the fiber receptacle can generally be moved in the stationary coordinate system and thus the fiber structure with the manipulator, e. g. a cage-shaped fiber receptacle. Combinations are also possible, i. e. a movement of both the fiber receptacle and the fluid jet head (each viewed in the stationary coordinate system). For example, the fiber receptacle can be arranged on a manipulator, such as a jointed-arm robot (see above), and the fluid jet head can also be arranged on a manipulator, such as another jointed-arm robot. In this way, different relative arrangements can be realized in a particularly flexible manner.

According to a preferred embodiment, the fiber structure has different properties in different areas, namely in the readily solidified state, e. g. when it is removed from the fiber receptacle. The "different properties" can be, for example, a different fiber density (volume proportion of the fibers per unit volume) and/or a different mass density (weight per unit volume) and/or a different pore structure; alternatively or additionally, the fibers can also differ in different areas, e. g. a difference in the fiber material and/or the fiber length or thickness is possible. Fibers of different colors allow for design and labelling possibilities, for example, the fiber structure can be differently colored in different areas. The property or properties in question can change abruptly from area to area or along a gradient.

According to a preferred embodiment, the fiber structure already has a three-dimensional shape before bonding, e. g. it not only has an extension in two mutually perpendicular area directions, but also in a thickness direction perpendicular thereto (see above). This expansion in the thickness direction can in particular vary across the fiber structure, i. e. the fiber structure can have a contour, for example. The combination with the fluid jet head can be advantageous, for example, in that various locations or sides and surfaces of the three-dimensional fiber structure are easily accessible due to or with the relative movement by the manipulator. The fluid jet head can be placed in different relative positions and/or at different angles relative to the fiber structure so that it can be bonded (in certain areas) in a specific manner.

In general, a "three-dimensional fiber structure" can for instance have an extension of at least 0.5 cm, 1 cm, 2 cm, 3 cm, 5 cm, 10 cm or 15 cm in each of three mutually perpendicular spatial directions (xyz direction). Significantly larger expansions are also possible in at least two directions ("two-dimensional with contour" variant). Although structures of any size are generally conceivable, possible upper limits can be 3 m, 2 m or 1 m, for example.

According to a preferred embodiment, the fiber structure is composed of several fiber web components, e. g. several fiber web layers, before bonding. These can be structured differently, e. g. comparable to a height profile, and thus result in a three-dimensional shape when placed on top of each other. Furthermore, the fiber web components can also be building blocks that are put together in such a way that they result in the desired three-dimensional fiber structure. Alternatively to such an assembly of the fiber web structure, the fibers can also be brought into the desired shape in a respectively shaped cavity, i.e. a mold; they can be blown into the mold, for example.

According to a preferred embodiment, the fluid jet head is not only used for bonding, but in another operating mode, a part of the fiber structure is cut open or preferably separated with the fluid jet. The fluid jet head is also used for fluid jet cutting, e. g. water jet cutting. In this way, for example, unneeded edge areas in the finished fiber structure can be cut off and/or one or more holes or openings in general can be made in the fiber structure. Depending on its later use, such a hole can, for example, be used for assembly, such as fastening to a body or housing part. In a "cutting" operating mode, the fluid can, for example, be dispensed at a higher pressure and/or from a smaller number of nozzles, and a longer action per unit area is possible compared to the "bonding" operating mode. Regardless of these details, the integration of the additional operating mode can further increase flexibility, whereby, for example, no additional equipment is required compared to a production line with a separate fluid jet cutting unit.

The invention also relates to a method of manufacturing a part for a body part, a housing part, a garment, a seat or back cushion, a packaging cushion or an insulating component, wherein the molded part is manufactured in a method disclosed herein by bonding a fiber structure.

Below, the invention is explained by means of an exemplary embodiment, whereby the individual features can also be relevant to the invention in other combinations within the scope of the independent claims and no distinction is made in detail between the different categories of claims.

BRIEF DESCRIPTION OF THE DRAWINGS

In detail shows

DETAILED DESCRIPTION OF THE PREFERRED EMBODIMENTS

Figure 1:
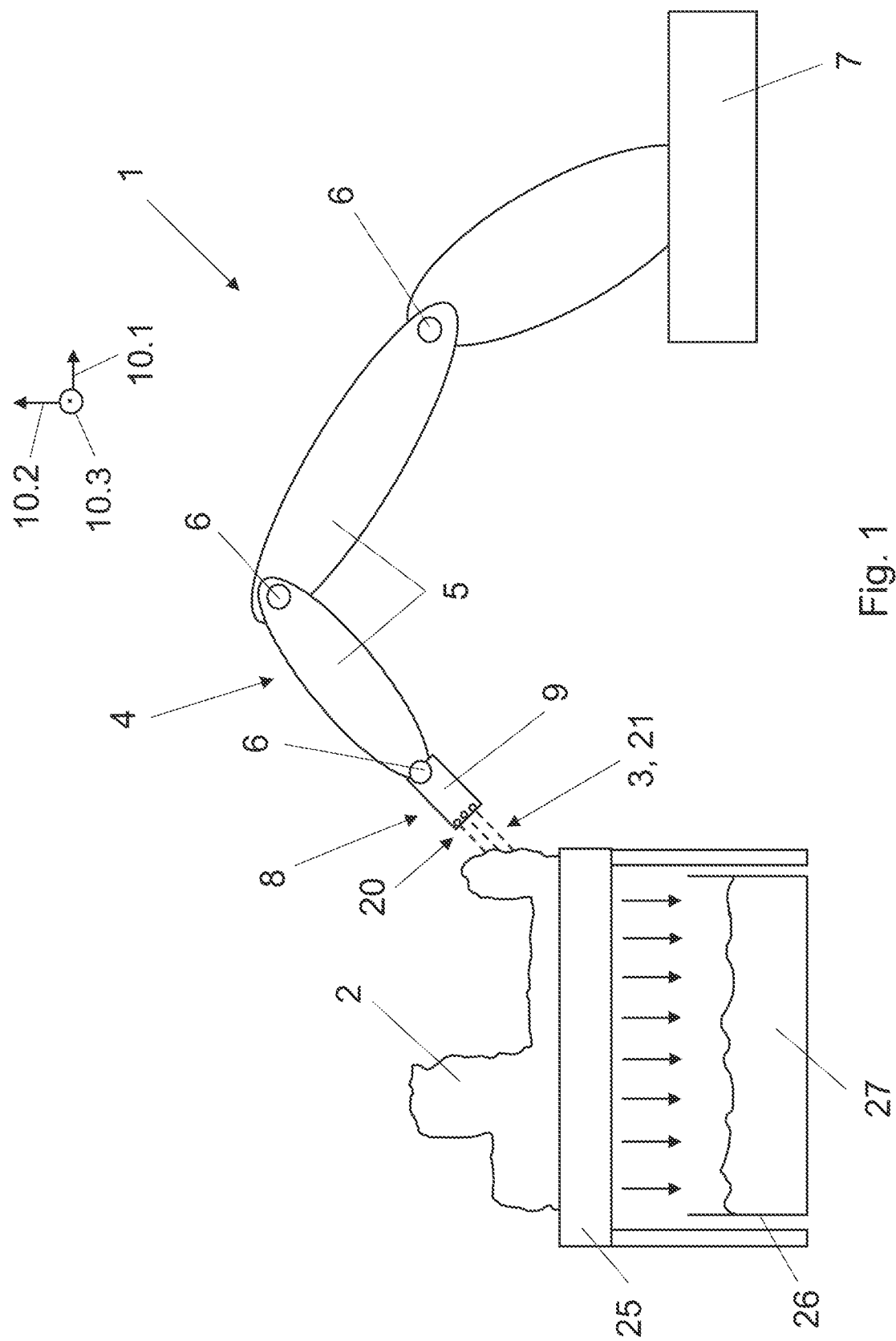
FIG. 1 an apparatus according to the invention with a fiber receptacle, a manipulator and a fluid jet head.

FIG. 1 shows an apparatus 1 for bonding a fiber structure 2 by means of a fluid 3. The apparatus 1 has a manipulator 4, which in this case is designed as a multi-axis robot. This has several articulated arms 5, which are connected to each other via swivel joints 6. The articulated arms 5 are also mounted horizontally rotatably on the base 7 so that any point within the range can be approached within an xyz coordinate system spanned by the spatial directions 10.1, 10.2, 10.3. A fluid jet head 9 is provided as an effector 8, which is also connected via a swivel joint 6. The fluid jet head has several nozzles 20 through which the fluid 3 is emitted during operation, see also the detailed illustration according to FIG. 2.

With the manipulator 4, the fluid jet head 9 can be moved relative to a fiber receptacle 25, on which the fiber structure 2 rests in the present example without lateral enclosure etc. In order to obtain a schematically shown three-dimensional structure, it can have a support structure inside, e. g. a wire frame. Alternatively or additionally, a three-dimensional structure can also be provided by a three-dimensionally shaped surface of the fiber receptacle 25, see below in detail. The fiber receptacle 25 has holes, not shown here, through which the fluid, in this case water, is emitted downwards after acting on the fiber structure 2. Below the fiber receptacle 25, a trough 26 is arranged, in which the residual water 27 is collected, and it can, for example, be recirculated and fed back to the fluid jet head 9 (not shown).

The relative movement between the fiber receptacle 25 and the fluid jet head 9 adjusts the position of the fluid jet head relative to the fiber structure 2. Different areas of the three-dimensionally formed fiber structure 2 can be targeted in order to bond the fibers in certain areas or to bond them even more in comparison to the rest of the fiber structure 2.

Figure 2:
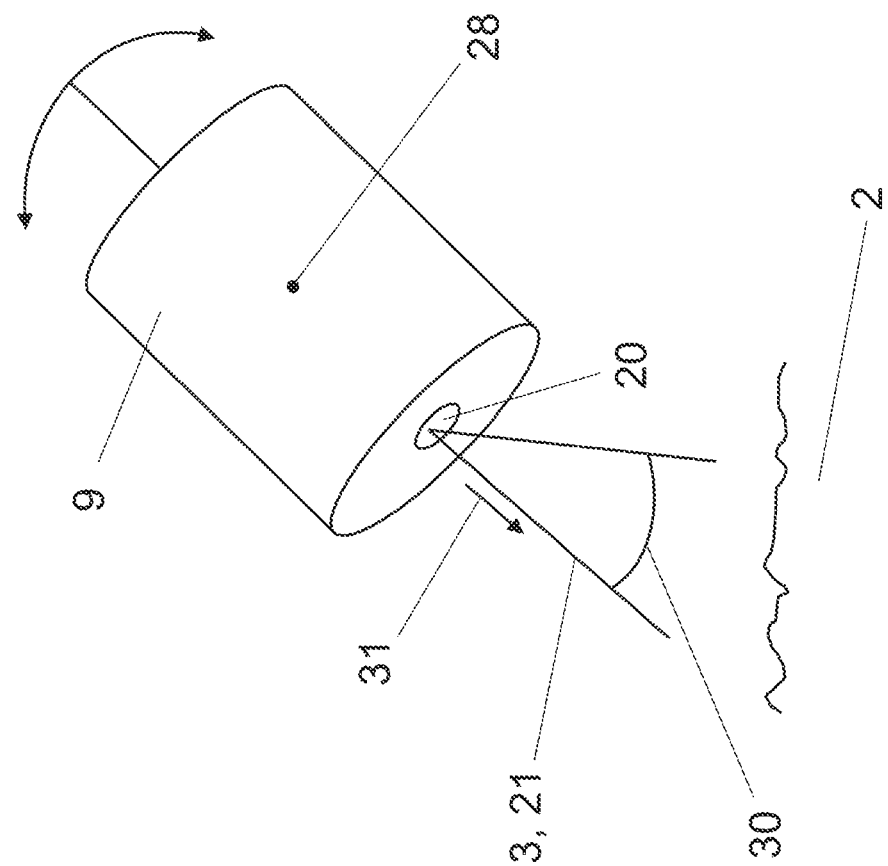
FIG. 2 a detailed view of a fluid jet head.

As shown in detail in FIG. 2, not only the position of the center of gravity 28 of the fluid jet head 9 relative to the fiber structure 2 can be changed, but also an angle of incidence 30, which includes a main emission direction 31 of the nozzle 20 with the fiber receptacle 25 or the fiber structure 2. In other words, the fluid jet head 9 can be tilted relative to the fiber structure 2, i.e. a respective water jet 21 can be directed specifically at an angle onto the fiber structure 2 and/or, in the case of a contoured surface, the incidence can also be kept constant with the tilting.

Figure 3:
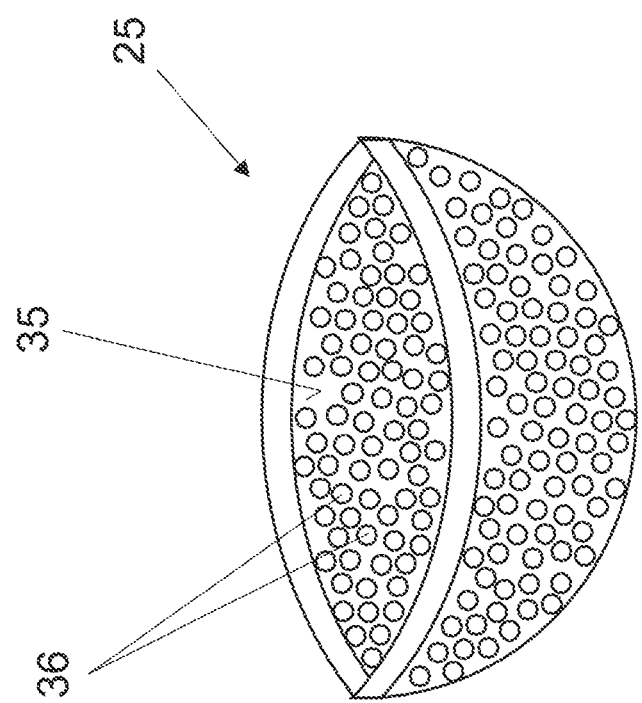
FIG. 3 shows a fiber receptacle in detail.

FIG. 3 illustrates an alternative fiber receptacle 25, which is shaped like a bowl. Accordingly, a surface 35, against which the fiber structure not shown here rests, has a concave curvature. With this preformed surface 35, a shape can be given to the fiber structure, i. e. a shell-shaped curved molded part can be created. This can be used, for example, as an insert for a garment, such as a brassiere.

For small series or prototype production, the fiber receptacle 25 can be individually adapted, for example, using a 3D printing method. A number of holes 36 can be seen in the surface 35, which serve to drain the fluid as described above.

Figure 4:
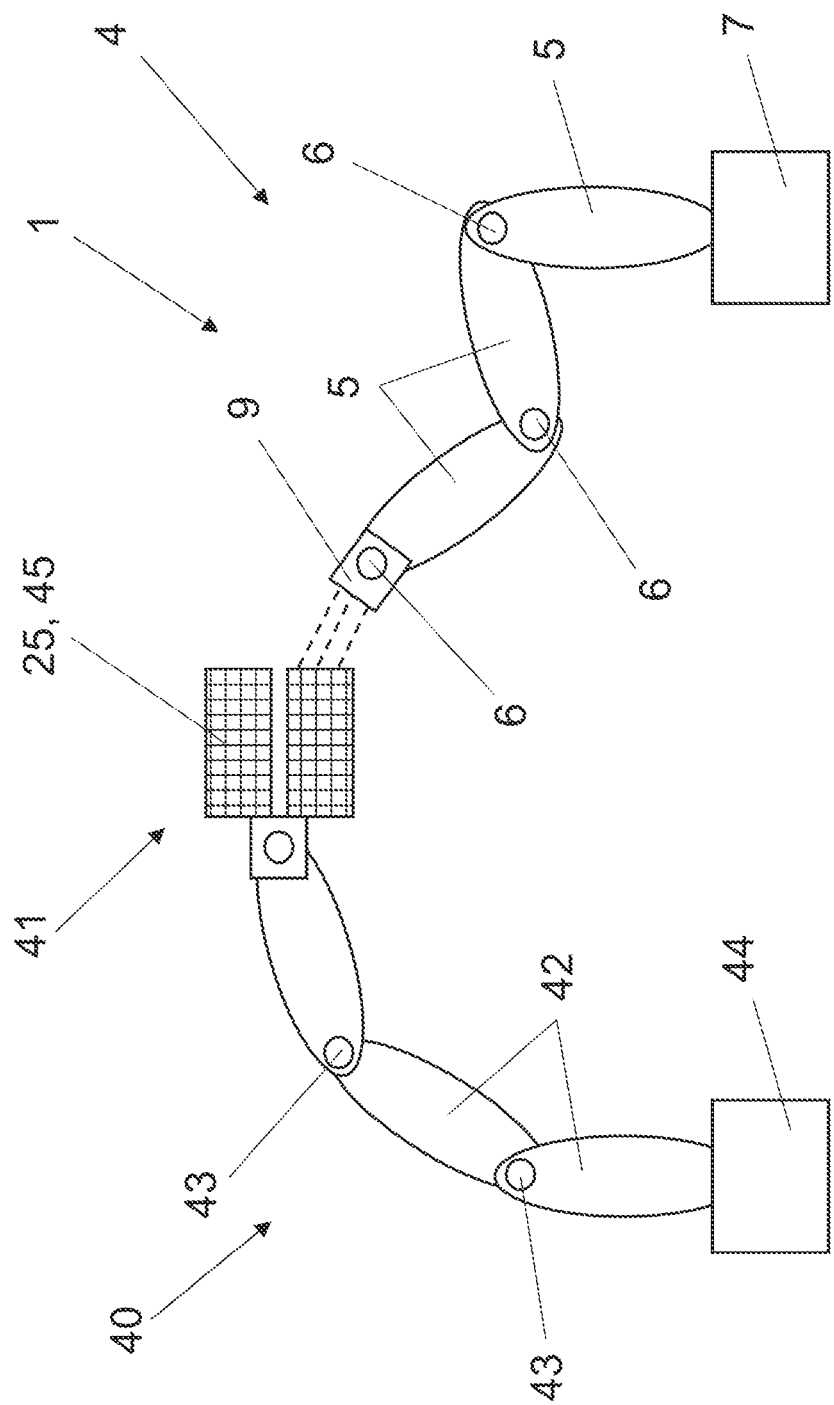
FIG. 4 another apparatus according to the invention with manipulator and fluid jet head, whereby the fiber receptacle is also arranged on a manipulator.

FIG. 4 shows an apparatus 1 which, with regard to the manipulator 4 and the fluid jet head 9, is constructed similarly to that shown in FIG. 1. In contrast to this, however, the fiber receptacle 25 is not provided in a fixed position but is arranged on a further manipulator 40. The fiber receptacle 25 thus forms its effector 41. This means that the fiber receptacle 25 and the fluid jet head can be brought into a number of different relative positions, i. e. the fiber structure (not shown here) can be bonded from "above" and "below" or laterally. To prevent it from falling out, the fiber receptacle is provided in the form of a cage 45 which can be opened for inserting and removing the fiber structure. The further manipulator 40 is constructed analogously to the manipulator 4 as a multi-axis robot with several articulated arms 42, which are connected to each other via swivel joints 43 and are arranged on a common base 44.

Figure 5:
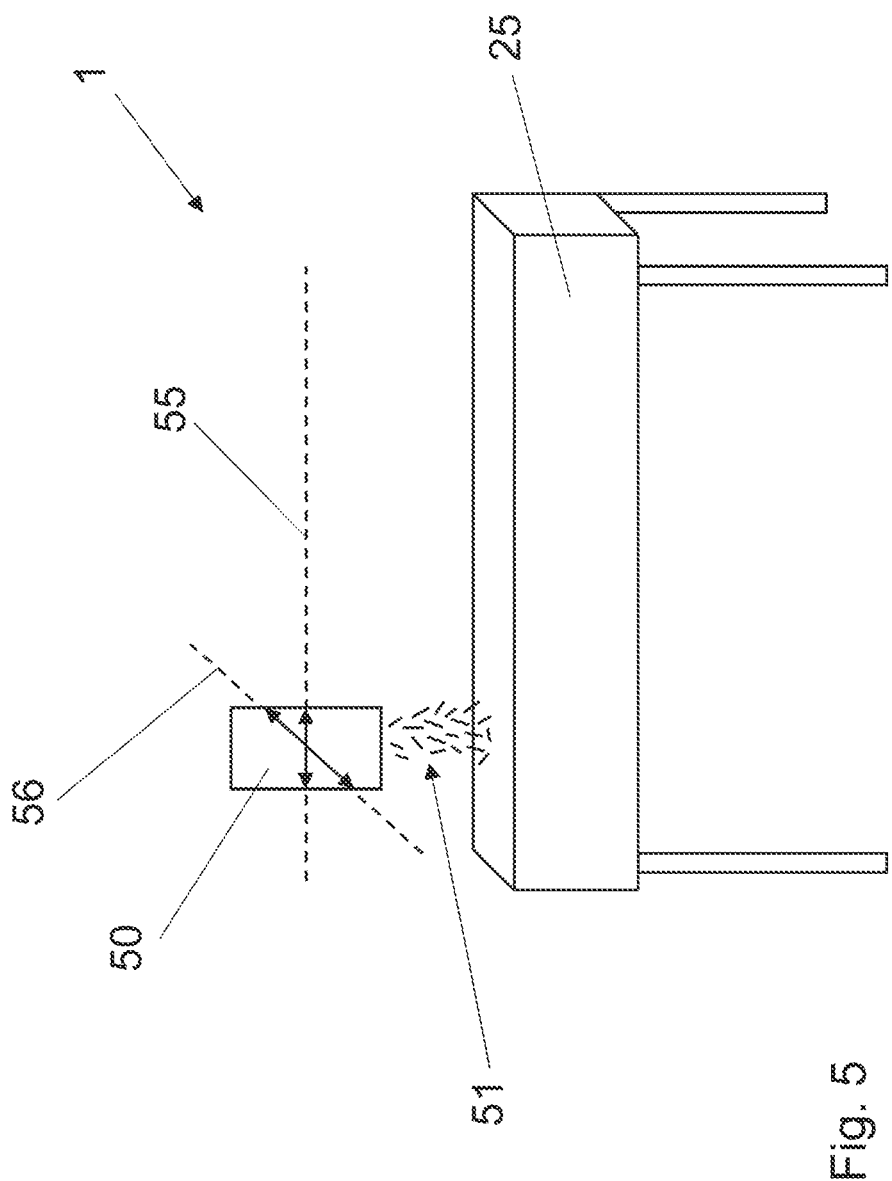
FIG. 5 a fiber receptacle with a fiber emission unit for the selective application of fibers in certain areas.

FIG. 5 shows an apparatus 1 which is comparable in principle to that shown in FIG. 1, whereby the manipulator 4 with the fluid jet head 8 is not shown for the sake of clarity. The apparatus 1 is additionally equipped with a fiber emission unit 50, at which fibers 51 can be emitted and applied to the fiber receptacle 25 or the fiber structure 2. The fibers 51 can, for example, be sprayed on, i. e. accelerated by compressed air in the direction of the fiber receptacle 25. The fiber emission unit 50 is movably mounted on two linear axes 55, 56, in this case suspended on a gantry robot. It can thus be moved over the surface of the fiber receptacle 25, whereby fibers 51 can be selectively applied in predefined areas by switching the fiber emission on and off.

The invention claimed is:

1. Apparatus for bonding a fiber structure by means of a fluid, comprising
 a fluid jet fiber entanglement head having a plurality of nozzles for emitting the fluid,
 a manipulator, and
 a fiber receptacle for arranging the fiber structure,
 wherein the fluid jet head is arranged as an effector on the manipulator,
 and wherein the manipulator is provided in such a way that the fluid jet head arranged thereon is movable therewith in three spatial directions relative to the fiber receptacle.

2. Apparatus according to claim 1, in which the manipulator is provided in such a way that, in a respective relative position of the fluid jet head to the fiber receptacle, an angle of incidence which has a main emission direction of the nozzle with respect to the fiber receptacle can be varied.

3. Apparatus according to claim 1, in which a surface of the fiber receptacle, which is provided for a contact against the fiber structure, is bulged at least in regions.

4. Apparatus according to claim 1, wherein a surface of the fiber receptacle provided for a contact against the fiber structure has a plurality of openings for discharging the fluid emitted from the nozzle after exposure to the fiber structure.

5. Apparatus according to claim 1, in which at least a surface part of the fiber receptacle, which forms a surface intended for a contact against the fiber structure, is an additively manufactured component.

6. Apparatus according to claim 1, comprising a further manipulator, wherein the fiber receptacle is arranged as an effector on the further manipulator.

7. Apparatus according to claim 1, comprising a fiber emission unit with which fibers can be applied to the fiber receptacle or the fiber structure.

8. Apparatus according to claim 1, wherein the fluid jet head comprises at most 10 nozzles for emitting the fluid.

9. Apparatus according to claim 1, wherein the fluid jet head comprises a plurality of nozzles, wherein the plurality of nozzles occupy a total area of at most 5 $cm^2$.

10. Method for bonding a fiber structure, in particular by means of an apparatus according to claim 1,
 in which method a fluid jet head, which has a nozzle, and a fiber receptacle, in which a fiber structure is arranged, are moved relative to one another in at least two spatial directions by means of a manipulator,
 wherein during this relative movement a fluid is emitted at least temporarily from the nozzle of the fluid jet head in order to bond the fiber structure.

11. Method according to claim 10, in which the fiber structure has different properties in different areas.

12. Method according to claim 11, in which the different properties of the fiber structure in different areas are at least also due to fibers which differ in the different areas of the fiber structure in at least one of their lengths, their thickness, their material and their color.

13. Method according to claim 10, in which the fiber structure already has a three-dimensional shape before solidification.

14. Method according to claim 13, in which the fiber structure is assembled of a plurality of three-dimensional fiber web components before bonding.

15. Method according to claim 10, in which, in another operating mode, the fluid emitted from the nozzle of the fluid jet head is used to open or separate a part of the fiber structure.

16. Method of manufacturing a part for a body part, a housing part, a garment, a seat or backrest cushion, a packaging cushion or an insulating component by solidifying a fiber structure in a method according to claim 10.

17. Apparatus according to claim 1, wherein the fluid jet head comprises at most 500 nozzles for emitting the fluid.

* * * * *